US008850062B2

(12) United States Patent
Boutros et al.

(10) Patent No.: US 8,850,062 B2
(45) Date of Patent: Sep. 30, 2014

(54) DISTRIBUTED CONNECTIVITY VERIFICATION PROTOCOL REDUNDANCY (75) Inventors: Sami Boutros, San Ramon, CA (US); Sylvain Masse, Suisse (CH); Clarence Filsfils, Brussels (BE)

(73) Assignee: Cisco Technology, Inc., San Jose, CA (US)

( * ) Notice: Subject to any disclaimer, the term of this patent is extended or adjusted under 35 U.S.C. 154(b) by 655 days.

(21) Appl. No.: 12/853,006

(22) Filed: Aug. 9, 2010

(65) Prior Publication Data
US 2012/0036279 A1 Feb. 9, 2012

(51) Int. Cl.
| G06F 15/16 | (2006.01) |
| G06F 15/173 | (2006.01) |
| H04L 12/26 | (2006.01) |
| H04L 12/721 | (2013.01) |
| H04L 12/709 | (2013.01) |
| H04L 12/24 | (2006.01) |

(52) U.S. Cl.
CPC ............ H04L 43/0811 (2013.01); *H04L 45/68* (2013.01); *H04L 45/245* (2013.01); *H04L 41/0663* (2013.01)
USPC ............ 709/238; 709/203; 709/227; 709/244

(58) Field of Classification Search
USPC ........................................................ 709/238
See application file for complete search history.

(56) References Cited

U.S. PATENT DOCUMENTS

| 7,065,268 B2 | 6/2006 | Prairie et al. |
| 7,499,395 B2 | 3/2009 | Rahman et al. |
| 7,515,529 B2 | 4/2009 | Vasseur et al. |
| 7,522,595 B2 | 4/2009 | Ben-Dvora et al. |
| 7,639,699 B2 | 12/2009 | Tallet et al. |
| 7,822,047 B2* | 10/2010 | Hallivuori ...................... 370/401 |
| 7,839,784 B2* | 11/2010 | Luo et al. ....................... 370/232 |
| 7,839,789 B2* | 11/2010 | Kakadia et al. ................ 370/235 |
| 7,903,554 B1* | 3/2011 | Manur et al. ................ 370/230.1 |
| 7,940,678 B2* | 5/2011 | Tan ................................ 370/242 |

(Continued)

FOREIGN PATENT DOCUMENTS

EP          1202504 A2    5/2002

OTHER PUBLICATIONS

Nadeau, T. and Pignataro, C. "Pseudowire Virtual Circuit Connectivity Verification (VCCV): A Control Channel for Pseudowires," RFC 5085, Dec. 2007, pp. 1-31.*

(Continued)

*Primary Examiner* — Melvin H Pollack
(74) *Attorney, Agent, or Firm* — Novak Druce Connolly Bove + Quigg LLP (57) ABSTRACT In one embodiment, a connectivity verification protocol (CVP) session for a particular virtual interface (VI) may operate on a particular group of two or more line cards (LCs) on a network device. The group of LCs may then transmit CVP session packets, at a reduced rate that is sufficient to maintain the CVP session based on a negotiated CVP full rate, onto the particular VI through ingress path processing on the network device. Ingress path processing, in particular, takes transmitted CVP session packets and egresses them onto an appropriate LC of the network device currently responsible for the VI egress. Also, in response to receiving CVP session packets for the VI on an LC of the network device currently responsible for the VI ingress, the receiving LC may forward the received CVP session packets to the particular corresponding group of LCs, which may then process the received CVP session packets.

22 Claims, 8 Drawing Sheets (56) References Cited

U.S. PATENT DOCUMENTS

| | | | |
|---|---|---|---|
| 7,948,900 B2* | 5/2011 | Hart et al. | 370/238 |
| 7,983,274 B2* | 7/2011 | Krzanowski | 370/395.5 |
| 7,990,852 B1* | 8/2011 | Cirkovic et al. | 370/228 |
| 7,991,016 B2* | 8/2011 | Cankaya et al. | 370/503 |
| 8,014,275 B1* | 9/2011 | Sundt et al. | 370/217 |
| 8,054,830 B2* | 11/2011 | Jain et al. | 370/389 |
| 8,064,338 B2* | 11/2011 | Kini et al. | 370/225 |
| 8,139,479 B1* | 3/2012 | Raszuk | 370/228 |
| 8,144,601 B2* | 3/2012 | Liu | 370/241.1 |
| 8,144,711 B1* | 3/2012 | Pegrum et al. | 370/394 |
| 8,165,032 B1* | 4/2012 | Hanif et al. | 370/248 |
| 8,179,883 B2* | 5/2012 | Bao et al. | 370/352 |
| 8,189,579 B1* | 5/2012 | Krishnaswamy et al. | 370/389 |
| 8,194,535 B2* | 6/2012 | Kodialam et al. | 370/217 |
| 8,200,839 B1* | 6/2012 | Aysan et al. | 709/238 |
| 8,208,469 B2* | 6/2012 | Tochio | 370/392 |
| 8,218,430 B2* | 7/2012 | Zhao | 370/218 |
| 8,218,432 B2* | 7/2012 | Le Roux et al. | 370/221 |
| 8,218,569 B2* | 7/2012 | DelRegno et al. | 370/466 |
| 2006/0209685 A1 | 9/2006 | Rahman et al. | |
| 2007/0130295 A1 | 6/2007 | Rastogi et al. | |
| 2007/0291752 A1 | 12/2007 | Ben-Dvora et al. | |
| 2008/0037436 A1 | 2/2008 | Liu | |
| 2008/0195733 A1 | 8/2008 | Detienne et al. | |
| 2009/0010153 A1 | 1/2009 | Filsfils et al. | |
| 2009/0010171 A1 | 1/2009 | Gupta et al. | |
| 2009/0094354 A1 | 4/2009 | Rastogi et al. | |
| 2011/0032938 A1* | 2/2011 | Kunjidhapatham et al. | 370/392 |
| 2011/0090786 A1* | 4/2011 | Liu et al. | 370/221 |
| 2011/0122889 A1* | 5/2011 | Pacella et al. | 370/428 |
| 2011/0134791 A1* | 6/2011 | So | 370/253 |
| 2011/0238843 A1* | 9/2011 | Pan et al. | 709/227 |
| 2011/0261812 A1* | 10/2011 | Kini et al. | 370/389 |

OTHER PUBLICATIONS

Katz, D. and Ward, D. "Bidirectional Forwarding Detection (BFD)," RFC 5880, Jun. 2010, pp. 1-50.*

Lang, J. "Link Management Protocol (LMP)," RFC 4204, Oct. 2005, pp. 1-86.*

Mannie, E. "Generalized Multi-Protocol Label Switching (GMPLS) Architecture," RFC 3945, Oct. 2004, pp. 1-69.*

Matke, Tony. "Bidirectional Forwarding Detection," Router Jockey, May 2010, pp. 1-7.*

"Bidirectional Forwarding Detection," Cisco IOS Software Releases 12.2SX, 2007, pp. 1-50.*

"Notification of Transmittal of the International Search Report and the Written Opinion of the International Searching Authority, or the Declaration," International Filing Date: Jul. 25, 2011, International Application No. PCT/US2011/001308, Applicant: CISCO Technology, Inc., Date of Mailing: Dec. 16, 2011, pp. 1-9.

* cited by examiner

DISTRIBUTED CONNECTIVITY VERIFICATION PROTOCOL REDUNDANCY

TECHNICAL FIELD

The present disclosure relates generally to computer networks, and, more particularly, to connectivity verification protocols for use with virtual interfaces.

BACKGROUND

Connectivity verification protocols (CVPs), such as bidirectional forwarding and detection (BFD), may be used in computer networks in order to verify the connectivity between devices within the network. In particular, it is often desirable to execute CVPs over virtual interfaces (VIs), such as tunnels and/or pseudowires, which are not bound to a particular interface or line card of the network devices. That is, the interface and line card on which a particular VI is operating (e.g., as an egress or ingress) depends upon convergence of various routing protocols. Executing CVPs over VIs of a network device, however, presents numerous challenges, particularly with regard to preventing false alarms and managing operability and accountability of the line cards responsible for managing the CVPs.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a connectivity verification protocol (CVP) session for a particular virtual interface (VI) may be configured to operate on a particular group of two or more line cards (LCs) on a network device. Accordingly, the group of LCs may then transmit CVP session packets, at a reduced rate that is sufficient to maintain the CVP session based on a negotiated CVP full rate (e.g., less than a negotiated CVP full rate), onto the particular VI through ingress path processing on the network device. Ingress path processing, in particular, takes transmitted CVP session packets and egresses them onto an appropriate LC of the network device currently responsible for the VI egress. Also, in response to receiving CVP session packets for the VI on an LC of the network device currently responsible for the VI ingress, the receiving LC may forward the received CVP session packets to the particular corresponding group of LCs, which may then process the received CVP session packets. In this manner, the CVP sessions for a VI may be distributed and redundant.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

Figure 1:
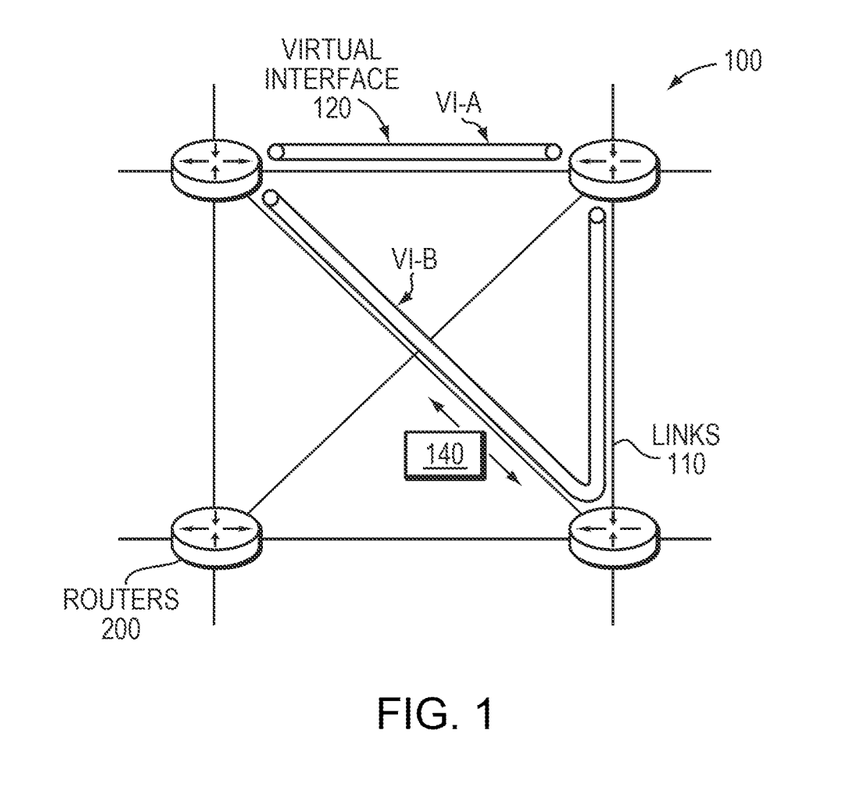
FIG. 1 illustrates an example computer network.

FIG. 1 is a schematic block diagram of an example computer network 100 illustratively comprising nodes/devices, such as routers 200 interconnected by links 110 as shown. Illustratively, on top of the links 110 may be one or more virtual interfaces (VIs) 120, such as tunnels, pseudowires, etc., as may be appreciated by those skilled in the art. Those skilled in the art will also understand that any number of nodes, devices, links, etc. may be used in the computer network, and that the view shown herein is for simplicity. Data packets 140 (e.g., traffic) may be exchanged among the nodes/devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, Multi-Protocol Label Switching (MPLS), Generic Route Encapsulation (GRE), etc.

Figure 2:
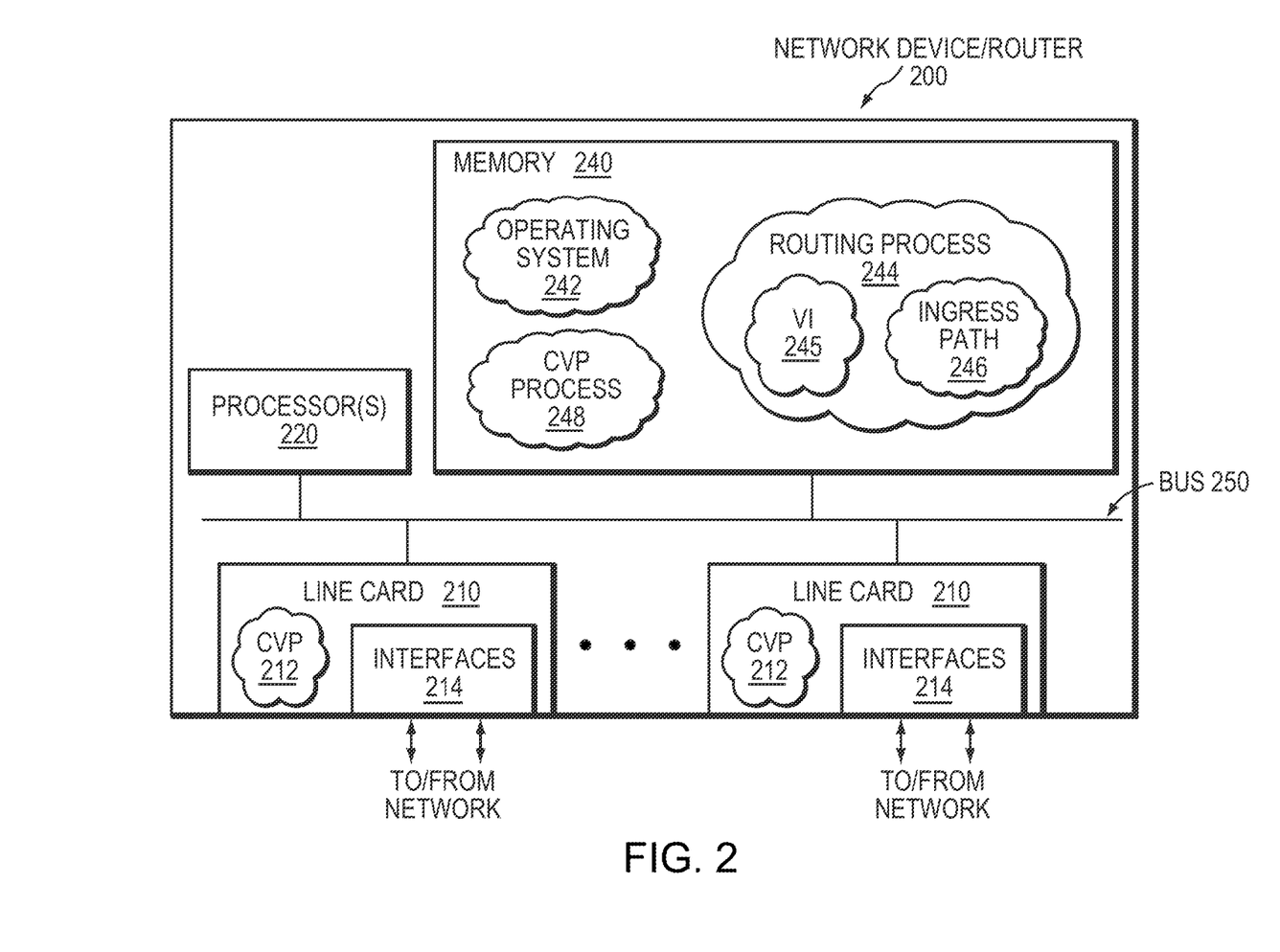
FIG. 2 illustrates an example network device.

FIG. 2 is a schematic block diagram of an example node/device 200 that may be used with one or more embodiments described herein, e.g., as a router. The device comprises a plurality of line cards, one or more processors 220, and a memory 240 interconnected by a system bus 250. The line cards (LCs) 210 contain the mechanical, electrical, and signaling circuitry for communicating data over physical network interfaces 214 (links) coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 214 may also be used to implement is one or more virtual network interfaces (VIs), such as tunnels (MPLS, GRE, etc.), pseudowires, etc., known to those skilled in the art. Also, as described herein, LCs 210 may also comprise one or more processes (executed by a processor), such as an illustrative "CVP process" 212.

The memory 240 comprises a plurality of storage locations that are addressable by the processor(s) 220 for storing software programs and data structures associated with the embodiments described herein. The processor 220 may comprise necessary elements or logic adapted to execute the software programs and manipulate the data structures, such as routing tables, etc. An operating system 242 (e.g., the Internetworking Operating System, or IOS®, of Cisco Systems, Inc.), portions of which are typically resident in memory 240 and executed by the processor(s), functionally organizes the node by, inter alia, invoking network operations in support of software processes and/or services executing on the device. These software processes and/or services may comprise routing process/services 244, a VI process 245, an ingress path process 246, and a connectivity verification protocol (CVP) process 248, as described herein. It will be apparent to those skilled in the art that other types of processors and memory, including various computer-readable media, may be used to store and execute program instructions pertaining to the techniques described herein. Further, the one or more processes as described herein may alternatively be embodied as hardware, software, and/or firmware modules configured with the functionality of the corresponding process, accordingly.

Routing services 244 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database (not shown) containing, e.g., data used to make forwarding decisions. In particular, changes in the network topology may be communicated among routers 200 using routing protocols, such as the conventional OSPF and IS-IS link-state protocols (e.g., to "converge" to an identical view of the network topology). Notably, routing services 244 may also perform functions related to virtual routing protocols 245 for virtual interfaces (VIs) 120, such as maintaining tunneling protocols, such as for Multi-Protocol Label Switching, etc., or pseudowire protocols, each as will be understood by those skilled in the art. In addition, as part of the virtual routing/interface process 245, an illustrative ingress path process 246 (e.g., a component of process 244 and/or 245) may also be illustratively configured to properly forward packets to physical interfaces based on virtual routing convergence, as described herein and as may be appreciated by those skilled in the art. For instance, as shown in FIG. 1, a VI labeled VI-A may be routed out a first physical interface and line card, but then for routing protocol purposes, may be moved to another physical interface and/or line card, shown as VI-B.

Connectivity verification protocol (CVP) services or process 248 contain computer executable instructions executed by processor 220 to verify connectivity between two systems/devices. Illustratively, a connectivity verification protocol that may be used is the bidirectional forwarding and detection (BFD) protocol. CVP services 248 may illustratively verify connectivity between two systems/devices depending on the transmission of control packets/messages between the two devices. Assume, for example, that a first device (a monitoring node) wishes to verify its connectivity to a second device (a monitored node) using a CVP such as BFD. The first device may transmit a message to the second device, and may verify connectivity based on a response/non-response from the second device, e.g., within a particular time period. If the first device does not receive a response from the second device within the time period, the first device determines that the CVP session has failed or "timed out" (or is "down"), accordingly. These messages may be transmitted back and forth at a negotiated rate, such that an opposing device can be deemed unreachable in the event a message is not received from that device within the expected time frame (negotiated rate plus a given detection multiplier to allow for a certain number of missed messages).

Figure 3:
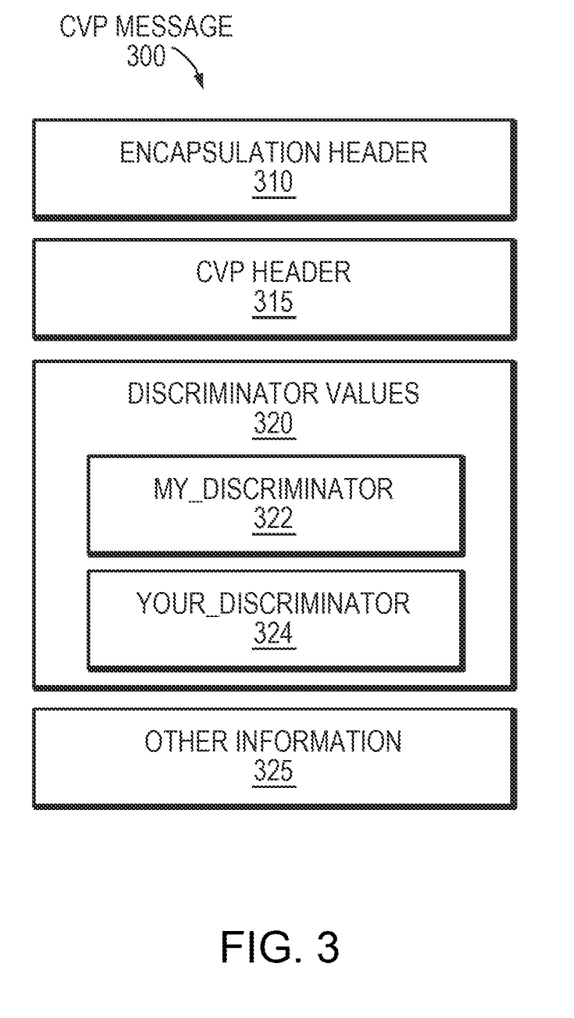
FIG. 3 illustrates an example signaling message/packet.

FIG. 3 illustrates an example connectivity verification protocol message 300 that may be transmitted by capable devices 200 (e.g., LCs 210). Illustratively, the message 300 is a generic message modeled after BFD messages, and those skilled in the art will understand that other messages (e.g., Echo messages) may comprise other fields accordingly. The message 300 includes an encapsulation protocol header 310, an optional CVP header field 315, a discriminator value field 320 (e.g., a "My_discriminator" 322 and/or "Your_discriminator" 324), and a field for other information 325. As those skilled in the art will understand, CVP messages 300 are sent in an encapsulation appropriate to the environment (e.g., TCP/IP, MPLS, etc.). Thus, the encapsulation protocol header 310 contains information standard for the specific type of encapsulation.

The CVP header field 315 may comprise standard CVP (e.g., BFD) header information, such as, e.g., a CVP version number, a message length, certain flags, etc., or other information (more or less) as configured by the sending device. Because a sending device may have more than one CVP session established at a time (e.g., with the same receiving device, or other receiving devices), the discriminator fields 320 contain sufficient information to demultiplex the messages 300 to the correct CVP session once it has been received by the receiving device. An example discriminator may be an opaque value that identifies each CVP session, and which is unique among all CVP sessions at each device. For instance, a "My_discriminator" value 322 is unique at the sending device, while a "Your_discriminator" 324 value is unique at the receiving device. Also, the other information field 325 may be used according to the CVP protocol, such as, e.g., timer interval values, authentication, etc. Notably, CVPs may operate across any number of links and at any protocol layer, e.g., Physical, Data Link, Network, Virtual, etc., as will be understood by those skilled in the art. Conventionally, if a CVP message 300 (e.g., Echo message) is not returned to the first device, the session is declared to be down by the first device. When a failure is detected (of the link or a remote node/device), interested applications, such as routing protocols, etc., may take appropriate action, e.g., removing any reference to the adjacency from routing/forwarding tables, and route traffic around the point of failure.

As noted above, it is often desirable to execute CVPs over virtual interfaces (VIs), such as tunnels and/or pseudowires, which are not bound to a particular interface or line card of the network devices. That is, the interface and line card on which a particular VI is operating (e.g., as an egress or ingress) depends upon convergence of various routing protocols. Executing CVPs over VIs of a network device, however, presents numerous challenges, particularly with regard to preventing false alarms and managing operability and accountability of the line cards responsible for managing the CVPs.

For example, a single-hop CVP session may be used to detect connectivity on tunnel interfaces or pseudowire (PW) Head-End interfaces. That is, a PW Head-End (PW-HE) interface may be used to terminate PW traffic on a service router (e.g., provider edge or "PE" device) and provide services to the PW traffic that originated from a customer site, and CVP may be used to monitor reachability over that interface. Since VI traffic (e.g., tunnel and PW-HE traffic) may terminate on any line card on the service router, the line card on which the traffic would terminate would depend on the routing state (e.g., IGP reachability) of the tunnel or PW-HE destination. Accordingly, to operate a CVP session for a VI, a distributed CVP may be used which executes on any chosen line card 210, rather than the current interface 214 itself. As such, the CVP Session packets 300 may be injected into ingress path processing 246 with an internal label/context, such that process 246 would switch the packets and make them egress out the current line card 210 where the tunnel/PW-HE interface is currently egressing.

While the above arrangement helps account for the ability of a virtual interface to change line cards (and interfaces), the CVP session is still tied to a single LC, which may fail independently of the VI. For instance, an LC may be "down" in response to LC online insertion and removal (OIR), LC hardware faults, CVP software upgrade on the LC, or CVP process crashes on LC. One option to provide redundancy is an "active/standby" redundancy with 2 LCs maintaining state about the CVP session. The active/standby solution, however, depends on the detection time of the local line card (or at least the CVP process) being down. If the CVP session interval is smaller than the detection time of the above events, false positives (alarms) may occur. In other words, latencies associated with routing protocols or central CVP processes operating on routers however, are not particularly well suited for use with high speed CVPs, such as BFD. For instance, to switch LCs in response to one going down requires detecting that the LC is down, switching to a backup (or altogether new) LC, and then sending CVP packets from that activated LC, thus resulting in many opportunities for extended and detrimental delay. The probability of false positives increases with the number of CVP sessions hosted on the downed line card, as well, since it takes more time to process all of the displaced sessions.

Distributed CVP Redundancy

According to one or more embodiments of the disclosure, due to the pitfalls of the active/standby solution, an "active/active" redundancy mechanism is described herein for the CVP session. Specifically, each CVP session operates on at least two line cards (LCs), where each LC maintains state about the CVP session, one LC assuming an active, primary role, the other LC(s) assuming a passive, backup role. As described herein, each LC actively sends CVP packets once the session is up, though at a reduced rate (e.g., a half rate) sufficient to maintain the CVP session. Illustratively, the techniques described herein may be performed by hardware, software, and/or firmware, such as in accordance with central CVP process 248 (or "CVP central"), which may contain computer executable instructions executed by the processor 220 to perform functions relating to the novel techniques described herein and in conjunction with LC CVP processes 212, which also contain computer executable instructions executed by a processor to perform functions relating to the novel techniques described herein.

Figure 4A:
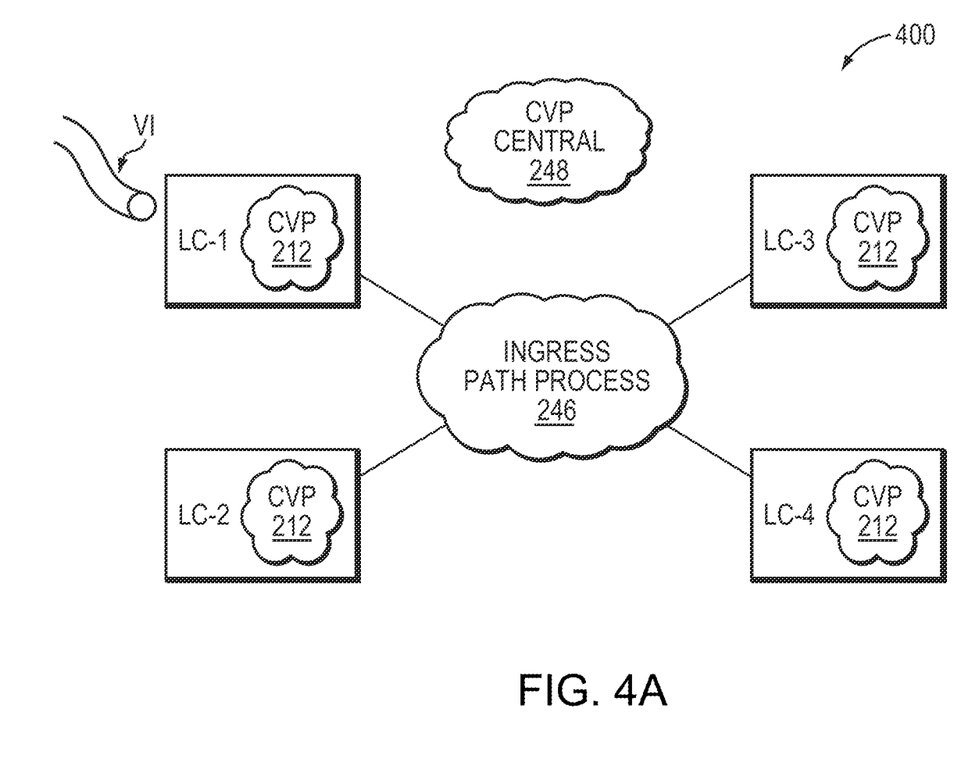
FIGS. 4A-G illustrate example message/packet handling within a network device.

Operationally, a plurality of LCs 210 on a router 200 may be divided into groups of at least two LCs, where in each group one LC is designated as a primary and the other LC as a backup. For example, with reference to FIG. 4A, which illustrates an example alternative view 400 of a router 200, showing LCs 1-4, a CVP central process 248, and an ingress path process 246. Accordingly, CVP central may determine LC groups, and may assign, to each group, a subset of VIs and corresponding CVP sessions for which each group is responsible. In other words, a CVP session for a particular VI may be configured for a particular group of LCs. (Note that not all LCs need be assigned to a group, and in an alternative embodiment, an LC may be assigned to more than one group.) For instance, CVP central may inform the LCs of each group that they are to manage a CVP single-hop session for any VI having a destination "X" (or with an inLabel="L" for MPLS). Illustratively, assume that a group responsible for the VI 120 shown comprises LC-3 as a primary LC and LC-4 as a backup LC.

In addition, hardware of the line cards may be programmed to direct all CVP packets 300 to a particular group of two or more LCs based on the VI ingress of the packet 300. In particular, when an LC receives a CVP packet with a your_discriminator value 324 corresponding to a certain group ID (e.g., GroupX/16), then that receiving LC may be programmed to quickly multicast the packets 300 to the two corresponding LCs. Also, as described below, when one LC in the group goes down, CVP central can assign another LC to the group, and re-program the hardware to direct GroupX/16 to this new LC along with the old LC.

Generally, only a primary LC would be responsible for CVP session establishment and tear down. For example, in a conventional manner, a primary LC (e.g., LC-3) may establish a CVP session over the VI by sending out a CVP packet 300 containing a my_discriminator value of its corresponding group ID (such that replies will be forwarded to its group of LCs), and a your_discriminator value of some initializing value, e.g., "0". The response CVP packet would then include a my_discriminator (of the opposing device) to replace the initializing value in a subsequent your_discriminator field.

Figure 4B:
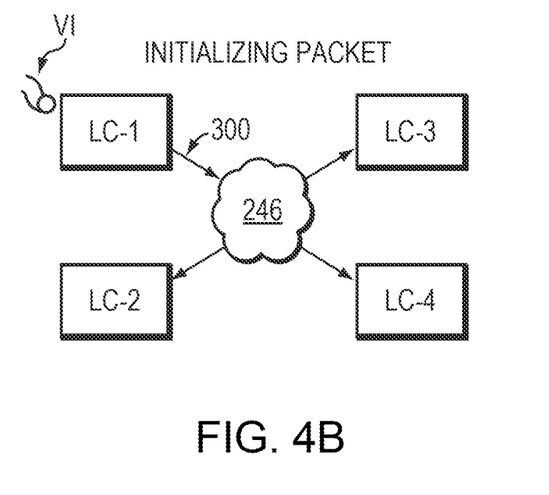

Note that in the reverse, any packets received with a your_discriminator value of "0" (or other initializing value) would be multicasted to all LCs of the router hosting CVP sessions, as shown in FIG. 4B. The primary LC responsible for the CVP session corresponding to the VI on which the CVP packet was received (e.g., based on a VI ID and knowing which VIs the LC is responsible for, as noted above) may then respond to the packet, accordingly. That is, the primary LC may return a packet with an appropriate my_discriminator value to replace the initializing value, such that a receiving LC in the future will know which group is to receive the packet.

Figure 4C:
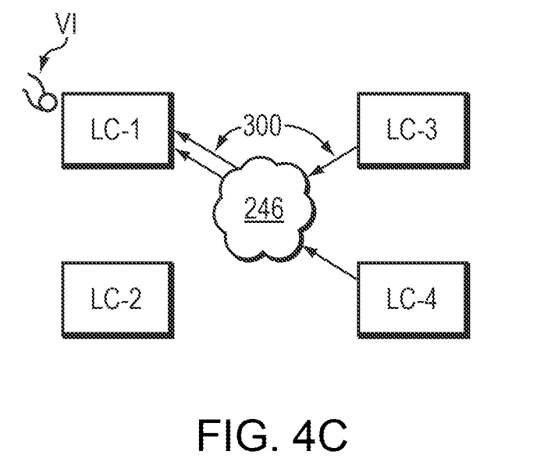

Once CVP central initiates a CVP session on a primary LC, then the primary and backup LC of the corresponding group would execute at a reduced rate from a highest timer value (either received in a CVP packet or given by the CVP central process). That is, both LCs of a group may transmit CVP session packets 300 onto the particular VI at a reduced rate that is less than a negotiated CVP full rate, e.g., half (since there are two LCs). As shown in FIG. 4C, the two LCs LC-3 and LC-4 each transmit a CVP packet at half rate (single line), which results in a full rate (double line) entering the VI, currently at LC-1.

For example, assuming the CVP is BFD, a corresponding hold-down timer may be configured as, e.g., 100 ms. Since, according to BFD, the packets 300 may not be sent at a rate higher than the negotiated rate, if there are two LCs in a particular group, then one condition to be met by the reduced rate is that the individual rate of each LC should be sufficient to send at most one packet every 100 ms. That is, the reduced rate of the primary and backup LCs could be one packet every 200 ms.

As another example, for other CVPs less restricted by higher rates, that is, the packets 300 may be sent at a rate sufficient to send at least one packet during the hold-down timer. As such, if a normal ("full") rate of a primary line card is established as one packet per every 50 ms, then a reduced rate may be, e.g., one packet every 75 ms in order to ensure that at least one packet is received within the hold-down period. In addition, the respective rates could also be different between the LCs, such as transmitting a packet by the primary LC every 75 ms and a packet by the secondary LC every 100 ms.

Notably, a control mechanism may be implemented to prevent ill-spaced bursts of packets, since the two LCs of a group typically act independently of one another. That is, assuming that a packet is to be sent at a full rate equal to once every 100 ms, half rate would be once every 200 ms. Without controlling the two LCs, both may transmit the packet every 200 ms (or at 20 ms and 180 ms, etc.), resulting in a burst or otherwise offset transmission of packets. Under certain conditions, this may result in false positives (false conclusions of failed CVP sessions) due to the sub-optimal spacing. Accordingly, measures may be implemented such as synchronizing clocks on the LCs and spacing the reduced rate packets appropriately (e.g., randomly or substantially perfectly alternating, i.e., near the negotiated rate). Alternatively or in addition, a CVP detection multiplier may be negotiated for the session that allows for a certain number of missed CVP packets (e.g., 2-4) prior to declaring a session down, thus accounting for the independent reduced rate transmission of CVP.

Figure 4D:
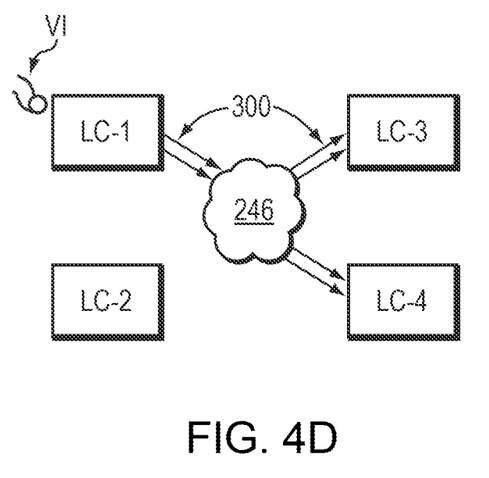

During an established session, a current ingress LC for a VI may receive CVP session packets for the VI, and may forward the received CVP session packets to the particular group of two or more LCs, accordingly. For instance, as described above, this may be based on the group ID within a your_discriminator value of the CVP packet. Both LCs of the group may then receive the packets, and at least one (e.g., the primary) may process the received CVP session packets to determine whether the state of the opposing device (peer) is up or down. Generally, the primary LC is responsible for informing a dataplane and CVP central process 248 of a state of the CVP session. FIG. 4D illustrates receipt of the CVP packets at near-full rate, and the forwarding of the packets via the ingress path process 246 to the two corresponding LCs for that VI.

Figure 4E:
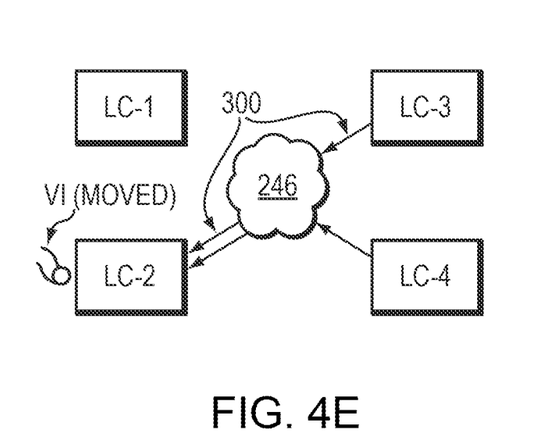

Note that as mentioned above, through ingress path processing on the network device, the network device egresses outgoing transmitted CVP session packets onto an appropriate LC that is currently responsible for the VI egress. Since this is based on routing protocols, in the event the VI egress line card changes, such as from LC-1 to LC-2 as shown in FIG. 4E, then ingress path processing simply redirects CVP packets from the responsible group's LCs to the appropriate egress LC.

Figure 4F:
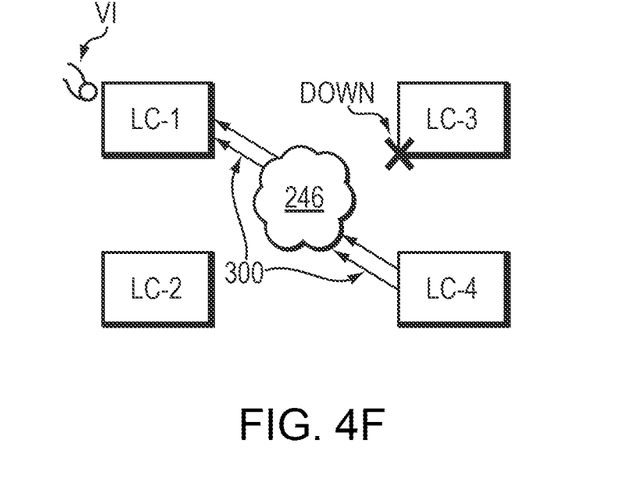
Figure 4G:
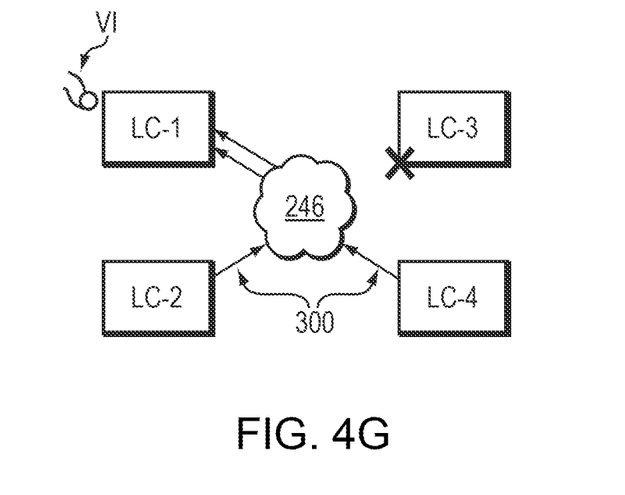

In response detecting that one of the LCs within a particular CVP session group goes down, e.g., from OIR, failure, etc., the remaining LC of the group may be directed to begin transmitting CVP session packets the CVP full rate (or other assigned rate), as shown in FIG. 4F. Notably, in the time it takes to direct this remaining CVP to transmit at the full rate, the reduced rate packets should be sufficient to maintain the CVP session. If it was the primary LC that went down, then the backup LC (once informed from CVP central) may be reassigned as the primary to assume control of the state maintenance. A new LC of the network device may later be assigned to the particular group, e.g., LC-2 as shown in FIG. 4G, at which time the remaining LC and new LC of the group may be directed to resume CVP packet transmission at the reduced rate. Notably, when another LC is assigned to the group, CVP central can re-program the hardware of the LCs 210 to direct received (ingress) CVP packets for this VI (based on the discriminator values) to this new LC along with the remaining LC.

Note also, that in order to preserve the local CVP session's state upon a primary LC failure, the central CVP process 248 may keep the last known good state received from the primary LC for at least T seconds, T being large enough for the backup LC to take over and confirm the state of the CVP session. Specifically, while the backup LC need not send the state information to CVP central regularly, the backup LC may still queue any BFD state transition for T seconds, such that if it becomes active before the T delay, the queued state may then be sent to CVP central. Generally, state information from a backup LC (not yet a primary) may be discarded as it is the role of the active primary LC to do so, but it may be beneficial to configure the central CVP process to handle overlapping notifications for the same CVP session.

Figure 5:
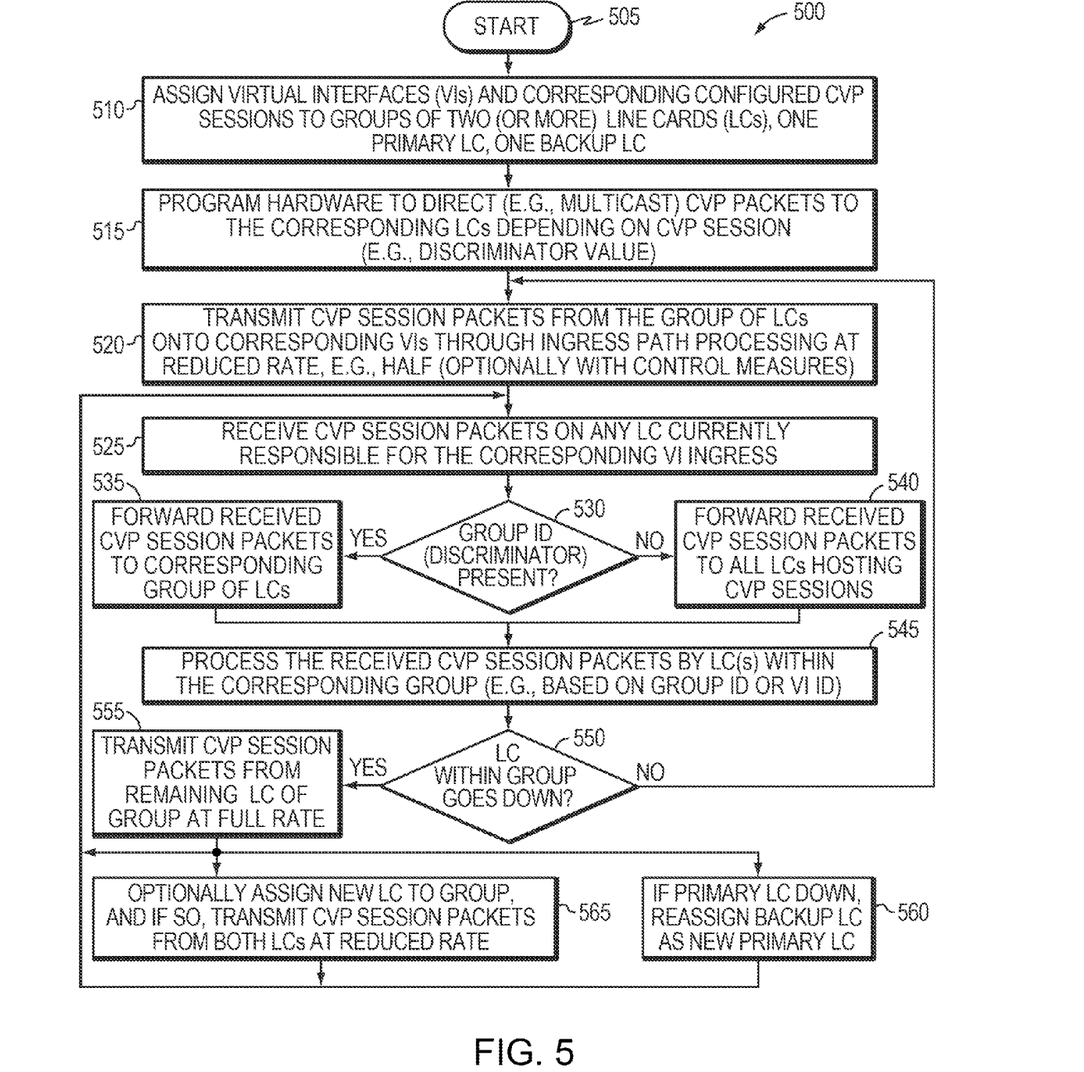
FIG. 5 illustrates an example procedure for distributed connectivity verification protocol redundancy.

FIG. 5 illustrates an example simplified procedure for providing distributed CVP redundancy in accordance with one or more embodiments described herein. The procedure 500 starts at step 505, and continues to step 510, where virtual interfaces 120 and any corresponding configured CVP sessions are assigned to groups of two (or more) LCs 210, one primary LC and one backup LC, as described above. Also, in step 515, hardware of the LCs may be programmed to direct (e.g., multicast) CVP packets 300 to the corresponding LCs depending on the associated CVP session of the packets (e.g., via a discriminator value 324).

In step 520, the group of LCs assigned to a particular CVP session may transmit CVP session packets 300 onto corresponding VIs 120 through ingress path processing 246 at the reduced rate (e.g., half). Optionally, as described above, the transmission timing may proceed with certain control measures, such as synchronized clocks, detect multipliers, etc. In step 525, any LC currently responsible for a VI ingress may receive a CVP session packet, and in step 530 checks the discriminator (group ID) value 324 to determine where to forward the packet. When there is an ID present, then in step 535 the received CVP session packet is forwarded (e.g., multicasted) to the corresponding group of LCs as directed in step 515. If, on the other hand, there is no ID present (e.g., a value of "0"), then in step 540 the packet may be forwarded to all LCs hosting CVP sessions to allow an appropriate LC to respond. Accordingly, in step 545, at least one LC (e.g., primary) within the corresponding group, based on the group ID or VI ID, may receive and process the CVP session packet.

The transmission and receipt of CVP packets may continue in this manner, and at some point in step 550 an LC within a particular group may go down (e.g., intentionally or unintentionally). If so, then in step 555 the remaining LC of the group may be directed to transmit CVP session packets at the full rate, and may, in step 560, be reassigned as a new primary LC for the group if the downed LC was the primary. Optionally, a new LC may be assigned to the group in step 565, at which time the remaining LC and newly assigned LC may transmit the CVP session packets at the reduced rate once again. The procedure 500 continues to transmit and receive packets, and react to downed LCs, until the CVP sessions are torn down or otherwise ceased. Note that while a particular order of steps is shown and described, the order is merely one representative example. For instance, step 520 may fall after 525-545, while steps 555-565 may occur in any order.

The novel techniques described herein provide distributed CVP redundancy, particularly for virtual interfaces, in a computer network. By having two LCs maintaining state for a given CVP session, both transmitting (e.g., at a reduced rate) and receiving all CVP packets for a given session, the novel techniques alleviate the latency associated with transitioning LCs, and reduce the number of false CVP alarms. In particular, the "Active/Active" techniques described above offer improved performance through smaller detection and reaction times (e.g., compared to an Active/Standby model) by having both LCs transmitting packets as soon as the CVP session is UP, thus relaxing the critical period where the other LC has to take over the full-rate transmission and the ownership of the CVP state machine before the session flaps. The solutions herein are also robust, being independent of detection time for LC OIR, hardware/ASIC errors (e.g., LC reload), CVP software upgrade on an LC, CVP process crashing on an LC, etc. Moreover, the dynamic aspects of one or more embodiments described herein (e.g., CVP central assignment of LCs to CVP sessions) alleviate the need for cumbersome and inefficient manual configuration.

While there have been shown and described illustrative embodiments that provide distributed CVP redundancy in a computer network, it is to be understood that various other adaptations and modifications may be made within the spirit and scope of the embodiments herein. For example, the embodiments have been shown and described herein using BFD as a primary example CVP. However, the embodiments in their broader sense are not so limited, and may, in fact, be used with other suitable CVPs. Also, while the illustrative example relies on a central CVP process in communication with a plurality of line cards, the embodiments herein may also be applied to other physical arrangements of network devices, such as those without physically removable line cards, or those that simply classify their egresses and ingresses as network interfaces (e.g., rather than one LC controlling multiple interfaces, each interface may act independently of one another).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   configuring a connectivity verification protocol (CVP) session for a particular virtual interface (VI) on a particular group of two or more line cards (LCs) on a network device;
   transmitting CVP session packets from the group of LCs onto the particular VI through ingress path processing on the network device, wherein the network device egresses the transmitted CVP session packets onto an LC of the network device currently responsible for the VI egress, each of the two or more LCs of the particular group transmitting the CVP session packets at a reduced rate, a combination of CVP session packets at the reduced rate from the two or more LCs of the particular group being sufficient to maintain the CVP session based on a negotiated CVP full rate;
   in response to receiving CVP session packets for the VI on an LC of the network device currently responsible for the VI ingress, forwarding the received CVP session packets to the particular group of two or more LCs; and
   processing the received CVP session packets by at least one of the two or more LCs within the particular group.

2. The method as in claim 1, further comprising:
   in response to one of the LCs within the particular group going down, assigning a new LC of the network device to the particular group.

3. The method as in claim 1, further comprising:
   in response to one of the LCs within the particular group going down, transmitting CVP session packets from a remaining LC of the particular group at the CVP full rate.

4. The method as in claim 3, further comprising:
   in response to assigning a new LC of the network device to the particular group, transmitting the CVP session packets from both the remaining LC of the particular group and the new LC at the reduced rate.

5. The method as in claim 1, wherein the particular group has two LCs, and the reduced rate is half of the negotiated CVP full rate.

6. The method as in claim 1, wherein one of the two or more LCs of the particular group is a primary LC, and where at least one other of the two or more LCs of the particular group is a backup LC.

7. The method as in claim 6, wherein the primary LC is responsible for establishing and tearing down the CVP session.

8. The method as in claim 6, further comprising:
   in response to the primary LC going down, reassigning the backup LC as a new primary LC.

9. The method as in claim 6, wherein the primary LC is responsible for informing a dataplane and CVP central process of the network device of a state of the CVP session.

10. The method as in claim 1, wherein a received CVP packet contains a group identifier (ID) within a discriminator value of the CVP packet, the group ID indicating to which group of LCs the received CVP packet is to be forwarded.

11. The method as in claim 1, further comprising:
    receiving a CVP packet having an initializing discriminator value; and in response,
    forwarding the CVP packet to all LCs of the network device hosting CVP sessions.

12. The method as in claim 11, further comprising:
    responding to the received CVP packet by a primary LC responsible for a CVP session corresponding to a VI on which the CVP packet was received.

13. The method as in claim 11, wherein the initializing discriminator value is "0."

14. The method as in claim 1, further comprising:
    assigning, to each group of a plurality of groups of two or more LCs, a subset of VIs and corresponding CVP sessions for which each group is responsible.

15. The method as in claim 1, further comprising:
    synchronizing clocks of the two or more LCs of the particular group; and
    transmitting the CVP session packets from the group of LCs at the reduced rate and spaced accordingly to egress the network device substantially near the negotiated CVP full rate.

16. The method as in claim 1, further comprising:
    negotiating a CVP detection multiplier to account for independent reduced rate transmission of CVP packets.

17. The method as in claim 1, wherein the CVP session is a bidirectional forwarding and detection (BFD) session.

18. The method as in claim 1, wherein the VI is selected from a group consisting of: a tunnel; and a pseudowire.

19. An apparatus, comprising:
- a processor adapted to execute one or more processes;
- a plurality of line cards (LCs) having network interfaces adapted to communicate on a computer network, one or more of the LCs configured to be responsible as an ingress or egress for virtual interfaces (VIs) of the apparatus;
- an ingress path module to egress received packet onto an LC of the apparatus currently responsible for a corresponding VI of the received packet;
- a connectivity verification protocol (CVP) module to configure a particular group of two or more LCs to be responsible for a CVP session for a particular VI;
- an LC CVP module on each of the two or more LCs of the particular group, the LC CVP module to:
  - transmit CVP session packets onto the particular VI through the ingress path module, wherein the ingress path module egresses the transmitted CVP session packets onto an LC of the apparatus currently responsible for the particular VI egress, each of the two or more LCs of the particular group transmitting the CVP session packets at a reduced rate, a combination of CVP session packets at the reduced rate from the two or more LCs of the particular group being sufficient to maintain the CVP session based on a negotiated CVP full rate;
  - process received CVP session packets; and
  - in response to receiving CVP session packets for a corresponding VI for which the particular LC is currently responsible for the VI ingress, forward the received CVP session packets to a correspondingly responsible group of LCs for the CVP session of that VI.

20. The apparatus as in claim 19, wherein the LC CVP module is further to:
- in response to one of the LCs within the particular group going down, transmit CVP session packets at the CVP full rate until a new LC of the apparatus is assigned to the particular group by the CVP central module, at which time the transmission resumes at the reduced rate.

21. The apparatus as in claim 19, wherein one of the two or more LCs of the particular group is a primary LC, and where at least one other of the two or more LCs of the particular group is a backup LC, the LC CVP module when operated as a primary LC further to: establish and tear down the CVP session, and inform the CVP central module of a state of the CVP session; and wherein the LC CVP module when operated as a backup LC further to: in response to the primary LC going down, act as a new primary LC.

22. A tangible computer-readable media having software encoded thereon, the software when executed operable to:
- configure a connectivity verification protocol (CVP) session for a particular virtual interface (VI) on a particular line card (LC) of a particular group of two or more LCs on a network device;
- transmit CVP session packets from the particular LC of the group of LCs onto the particular VI through ingress path processing on the network device, wherein the network device egresses the transmitted CVP session packets onto an LC of the network device currently responsible for the VI egress, each of the two or more LCs of the particular group transmitting the CVP session packets at a reduced rate, a combination of CVP session packets at the reduced rate from the two or more LCs of the particular group being sufficient to maintain the CVP session based on a negotiated CVP full rate;
- process received CVP session packets by the particular LC in response to the particular LC being a primary LC of the two or more LCs for the particular group; and
- in response to receiving CVP session packets for a corresponding VI for which the particular LC is currently responsible for the VI ingress, forward the received CVP session packets to a correspondingly responsible group of LCs for the CVP session of that VI.

\* \* \* \* \*